Patented Nov. 9, 1943

2,334,140

UNITED STATES PATENT OFFICE 2,334,140

PRODUCTION OF PROPIONITRILE

Charles F. Winans, Pittsburgh, Pa., assignor to Wingfoot Corporation, Akron, Ohio, a corporation of Delaware No Drawing. Application February 20, 1942, Serial No. 431,657

2 Claims. (Cl. 260—464)

This invention relates to the production of propionitrile by the reduction of acrylonitrile.

The reduction of acrylonitrile to propionitrile is described in the literature, for example, in Reppe & Hoffmann U. S. Patent 1,891,055. That patent describes carrying out the reduction with hydrogen in the presence of a copper catalyst. It states that satisfactory results are not obtained with a pyrophoric catalyst.

According to this invention, a pyrophoric catalyst is employed and highly satisfactory results are obtained. For example, a yield of about 90% of a commercially pure product is obtained. Methacrylonitrile can similarly be reduced to isobutyronitrile with the same pyrophoric catalyst although the yield obtainable in this reduction operation has not been determined. The invention is limited to the reduction of acrylonitrile. The catalyst used is the nickel catalyst known as Raney nickel.

As illustrative of the invention, 106 parts by weight of acrylonitrile dissolved in 108 parts by weight of ether were treated with hydrogen in the presence of Raney nickel. During the reaction the pressure varied from about 6 to 70 atmospheres. The reaction was started at room temperature. In 30 minutes the temperature had risen to 50° C. as a result of the heat of the reaction and sufficient hydrogen had been taken up to saturate the double bond. Distillation of the products gave 99 parts of propionitrile with a boiling point of 90–96° C. This was a 90% yield. Commercially pressures of 6 to 120 atmospheres will be employed. In general temperatures between about 20 and 75° C. will be used.

I claim:

1. The process of reducing acrylonitrile to propionitrile which comprises hydrogenating acrylonitrile under a pressure of about 120 atmospheres in the presence of Raney nickel as a catalyst, starting the reaction at room temperature and allowing the temperature to rise while adding to the reaction mixture sufficient hydrogen to saturate the double bond of the acrylo group.

2. The process of reducing acrylonitrile to propionitrile which comprises hydrogenating a solution of acrylonitrile at a pressure of at least 6 atmospheres and at a temperature between 20° C. and 75° C. in the presence of Raney nickel as a catalyst.

CHARLES F. WINANS.